(12) United States Patent
Amon et al.

(10) Patent No.: US 8,121,422 B2
(45) Date of Patent: Feb. 21, 2012

(54) IMAGE ENCODING METHOD AND ASSOCIATED IMAGE DECODING METHOD, ENCODING DEVICE, AND DECODING DEVICE

(75) Inventors: Peter Amon, München (DE); Gero Bäse, München (DE); Andreas Hutter, München (DE); Jürgen Pandel, Feldkirchen-Westerham (DE); Benoit Timmermann, Zorneding (DE)

(73) Assignee: Siemens Aktiengesellschaft, Munich (DE)

(*) Notice: Subject to any disclaimer, the term of this patent is extended or adjusted under 35 U.S.C. 154(b) by 1066 days.

(21) Appl. No.: 11/793,927

(22) PCT Filed: Dec. 9, 2005

(86) PCT No.: PCT/EP2005/056626
§ 371 (c)(1),
(2), (4) Date: Nov. 19, 2007

(87) PCT Pub. No.: WO2006/067053
PCT Pub. Date: Jun. 29, 2006

(65) Prior Publication Data
US 2008/0144950 A1    Jun. 19, 2008

(30) Foreign Application Priority Data
Dec. 22, 2004   (DE) .................... 10 2004 061 906

(51) Int. Cl.
*G06K 9/36* (2006.01)
*G06K 9/46* (2006.01)
*H04N 11/02* (2006.01)
*H04N 11/04* (2006.01)
*H04N 7/12* (2006.01)

(52) U.S. Cl. ..... 382/236; 382/232; 382/233; 375/240.12

(58) Field of Classification Search ........................ None
See application file for complete search history.

(56) References Cited

U.S. PATENT DOCUMENTS 6,968,005 B2 * 11/2005 Hannuksela ............. 375/240.01
7,180,944 B2 * 2/2007 Lin et al. .................. 375/240.16
(Continued)

FOREIGN PATENT DOCUMENTS
DE  10 2004 031 407 A1   1/2006
(Continued)

OTHER PUBLICATIONS

Jens-Rainer Ohm, et al. "Interframe wavelet coding—motion picture representation for universal scalability", Signal Processing: Image Communication, v19, 2004, 988-908.*
(Continued)

*Primary Examiner* — Samir A. Ahmed
*Assistant Examiner* — Li Liu
(74) *Attorney, Agent, or Firm* — Staas & Halsey LLP

(57) ABSTRACT

Disclosed is an image encoding method in which a series of decoded images are generated from a series of original images with the aid of a first encoding process. Furthermore, a series of second images are generated from an image group of the series of original images with the aid of an INTER encoding mode of the second encoding process, at least one decoded image being used as a reference image. The reference image represents an original image area is to be encoded. A image decoding method decodes second images generated by the image encoding method.

24 Claims, 7 Drawing Sheets

U.S. PATENT DOCUMENTS

| | | | |
|---|---|---|---|
| 7,266,150 B2 * | 9/2007 | Demos | 375/240.15 |
| 7,693,220 B2 * | 4/2010 | Wang et al. | 375/240.2 |
| 2002/0071485 A1 * | 6/2002 | Caglar et al. | 375/240.01 |
| 2002/0118742 A1 | 8/2002 | Puri et al. | |
| 2003/0138043 A1 * | 7/2003 | Hannuksela | 375/240.08 |

FOREIGN PATENT DOCUMENTS

| | | |
|---|---|---|
| JP | 2004-519909 | 7/2004 |

OTHER PUBLICATIONS

Mrak M. et al. "An Overview of Basic Techniques Behind Scalable Video Coding", Proceedings of the 46th International Symposium on Electronics in Marine, Elmar-2004, Jun. 16, 2004, pp. 597-602.

H.Schwarz, D.Marpe und T.Wigand, Fraunhofer Institut für Telekommunikation, Heinrich Herz Institut, "Scalable Extension of H.264/AVC", ISO/IEC JTC1/SC29/WG11, MPEG04/M10569/S03, März 2004.

Andreopoulos Y. et al., "Spatio-Temporal-SNR Scalable Wavelet Coding with Motion-Compensated DCT Base-Layer Architectures", Proceedings International Conference on Image Processing, vol. 3, Sep. 14, 2003, pp. 795-797.

S.Jun, S. Huifang, "Image and Video Compression for Multimedia Engineering", CRC-Press, 2000.

Videocodierstandard ITU-T H.264, "Advanced Video Coding for Generic Audio Visual Services", May 2003.

Videocodierstandard ITU-T H.263, "Videocoding for Low Bitrate Communication", Feb. 1998.

K. Hanke, RWTH-Aachen, http:/www.ient.rwth-aachen.de/forschung/pdf/3D-vidocodierung.pdf, 2004.

\* cited by examiner ion. The better an image encoding or video encoding method is able to exploit these dependencies between the individual images or pixels, the greater in general is a compression factor which can be achieved.

IMAGE ENCODING METHOD AND ASSOCIATED IMAGE DECODING METHOD, ENCODING DEVICE, AND DECODING DEVICE

CROSS REFERENCE TO RELATED APPLICATIONS

This application is based on and hereby claims priority to PCT Application No. PCT/EP2005/056626 filed Dec. 9, 2005 and German Application No. 10 2004 061 906.9 filed on Dec. 22, 2004, the contents of which are hereby incorporated by reference.

BACKGROUND

The invention relates to an image encoding method.

In accordance with K. Hanke, "*3D video encoding*," (2004), video encoding methods exploit specific signal properties for efficient encoding of a succession of images. In such cases spatial and temporal dependencies between the individual images or the pixels of these images are taken into account. The better an image encoding or video encoding method is able to exploit these dependencies between the individual images or pixels, the greater in general is a compression factor which can be achieved.

A basic distinction is made in current techniques for video encoding between hybrid encoding methods, such as the standards ITU-T H.263, "*Videocoding for Low Bitrate Communication*," (1998) or ITU-T H.264, "*Advanced Video Coding for Generic Audio Visual Services*," (2003), for example, and so-called three-dimensional frequency encoding approaches. Although both methods attempt to encode the video signal, which includes the succession of images, both spatially and also temporally, with hybrid encoding methods use is made initially of a movement-compensated prediction in the temporal direction and subsequently of a two-dimensional transformation of a difference image created, such as with the aid of a two-dimensional Discrete Cosine Transformation (DCT) for example, to enable a spatial correlation between adjacent pixels within the difference image to be removed.

With the three-dimensional frequency encoding approaches, such as the movement-compensated, temporally filtered partial band encoding for example, by contrast with the hybrid encoding methods, no temporal prediction but a "true" transformation in the direction of the time axis is performed, in order to thereby exploit the temporal correlation of consecutive images. With such partial band encoding the succession of images is encoded into a plurality of "temporal" frequency bands before the spatial two-dimensional decorrelation, such as with two frequency bands in a high and a low frequency band for the temporal high-frequency and low-frequency image components. In the fragmentation of the spectrum the distribution of the frequencies occurring in these frequency bands is heavily dependent on the size of the movement occurring in the video signal. Provided the observed video signal does not feature any moving or modified elements, all high-frequency "time spectrum components" are equal to zero and the total energy is concentrated on the partial frequency band. Normally however a change in an image over time will always be able to be seen in a succession of images, such as a local object displacement for example, a change of object size or a change of scene. This leads to a distribution of energy to a plurality of spectral coefficients, with high-frequency components also being produced.

To reduce the spectral components in the temporal high-frequency band and thus to concentrate the energy on the temporal low-frequency band, before the temporal filtering of the video signal into a plurality of "temporal" frequency bands, a movement estimation and a movement compensation of the images to be temporally filtered are undertaken.

According to H. Schwarz et al., "*Scalable Extension of H.264/AVC*," *Institute für Telekommunikation, Heinrich Herz Institut* (2004), ("Schwarz et al.") the movement-compensated, temporally-filtered partial band encoding can also be used for creating a scalable video data stream. A temporal, a qualitative or also a spatial scalability is made possible in this way. Furthermore a combined scaling is presented in Chapter 3.2.4 of Schwarz et al. In this case the aim is to produce two different basic qualities with the aid of the hybrid encoding method. To achieve improved image qualities additional scaled video data streams are included. These additional scaled video data streams are created in Schwarz et al. with the aid of a movement-compensated, temporally filtered partial band encoding. Thus it is known that a scalable video data stream can be created with the aid of a first encoding method following movement-compensated, predictive encoding and a second encoding method following movement-compensated temporally filtered partial band encoding.

A method is known from the German patent application with the official file reference 10 2004 031 407.1, in which, to create a scalable video stream, a hybrid encoding method with a three-dimensional frequency encoding method is used.

SUMMARY OF THE INVENTION

One possible object is to specify an image encoding method, an image decoding method, an encoding device and a decoding device which makes it possible to encode or to decode images in an efficient manner using a first and second encoding method.

With the image encoding method, especially as claimed in one of the claims 1 to 8 of the German patent application with the official file reference 10 2004 031 407.1, a succession of decoded images is created from a succession of original images with the aid of a first encoding method, a succession of second images is generated from an image group of the succession of original images with the aid of a second encoding method, with at least one image area of one of the second images being encoded with the aid of an INTER encoding mode of the second encoding method, with at least one of the decoded images being used by the INTER encoding mode as a reference image, and with a different original image being represented by the decoded image used as the reference image from the original image that is represented by the second image of the image area to be encoded.

At least one decoded image is taken into account by the image encoding method in the generation of the second images. The encoding efficiency can be increased in this way, since an improvement of the prediction is achieved with this generation in accordance with the INTER encoding mode of the second encoding method.

Preferably at least two decoded images are taken into account for encoding one of the second images, with the decoded image which represents the same original image as the second image to be generated additionally being included as a reference image. This enables a good representative to be found, so that an additional improvement of the prediction or of the compression is achieved.

If, preferably before the encoding of at least one area of the image of one of the second images, at least one partial area of a decoded image with a first image size is enlarged or reduced into a second image size, the image encoding method can also then be used if an image size of the second images differs from an image size of the decoded images. In addition an improvement in the prediction and the compression can be achieved.

If at least one decoded image is further created with the aid of the first encoding method by an INTRA encoding mode and/or of an INTER encoding mode and/or of a bidirectional predictive encoding mode, the encoding efficiency can additionally be increased for generation of the second images.

Furthermore the sequence of the decoded images can be created by the first encoding method with a first image refresh frequency and by the second encoding method the sequence of second images can be created with a second image refresh frequency. This enables the image encoding method to also be used for different image refresh frequencies of the second and of the decoded images and thereby an increased compression rate achieved.

Preferably the succession of the decoded images is created by the first encoding method at a plurality of first image quality levels and the succession of second images is created by the second encoding method at a plurality of second image quality levels, with, to generate the sequence of second images, the succession of the decoded images with the, especially highest, first image quality level being taken into account. Thus the image encoding method can also be used in a first and/or second encoding method which supports scalability levels. This leads to an increase in the compression rate.

Furthermore an identical encoding method or two different encoding methods can preferably be employed as the first encoding method and as the second encoding method, with a movement-compensated, predictive encoding especially being applied as the first encoding method and a movement-compensated temporally filtered partial band encoding being applied as the second encoding method. This means that both an identical and also two different encoding methods which encode a succession of original images can be used by the method for encoding.

In a further additional alternative of the method a bit stream can be created within the framework of the image encoding method in such as way that it includes at least one identifier which indicates the use of at least one decoded image in the generation of at least one second image. This enables an encoding device to transfer to a decoding device the bit stream which has been created in accordance with the method, with the bit stream describing in greater detail dependencies in the generation of the second images of at least one first decoded image.

The inventors also propose an image decoding method, especially as claimed in claim 8 of the German patent application with the official file reference 10 2004 031 407.1, characterized by steps for decoding at least one image encoded in accordance with the image encoding method, especially one of the second images, with a succession of reconstructed original images being generated with the aid of a second decoding method from a succession of second images, with at least one image area of one of the second images being decoded with the aid of an INTER decoding mode of the second decoding method, with at least one of the decoded images generated by a first encoding method being used by the INTER decoding mode as a reference image, and with a different original image being represented by the decoded image used as a reference from than the original image represented by the second image of the image area to be decoded. The decoded or second images created with the image encoding method are able to be decoded with the aid of the image decoding method. In this case the second images created by the second encoding method are decoded by the second decoding method, with the second decoding method including at least an INTER, INTRA and/or bidirectional predictive decoding mode.

Preferably a bit stream is decoded by the image decoding method within the framework of the image decoding method, with the bit stream including at least one identifier which indicates the use of at least one decoded image in the generation of at least one second image. This means that the decoding method can receive and decode the bit stream which has been created in accordance with the method, with the bit stream describing in greater detail dependencies in the generation of the second images from at least one first decoded image.

The invention further relates to the encoding device, especially as claimed in claim 9 of the German patent application with the official file reference 10 2004 031 407.1, which can execute an image encoding method, with a first unit for creating a succession of decoded images from a succession of original images with the aid of a first encoding method, a second unit for generating a succession of second images from an image group of the succession of original images with the aid of a second encoding method, with at least one image area of one of the second images being encoded with the aid of an INTER encoding mode of the second encoding method, with at least one of the decoded images being used by the INTER encoding mode as a reference image, and with a different image being represented by the decoded image used as the reference image from the original image which is represented by the second image of the image area to be encoded. It is made possible with the aid of the encoding device to implement the image encoding method and to execute it with the aid of the device.

Preferably the encoding device includes a transmitter for transmitting a bit stream which is created such that it includes at least one identifier which indicates the use of at least one decoded image in the generation of at least one second image. This allows the bit stream to be transmitted from the encoding device to the decoding device.

Furthermore the inventors propose the decoding device, especially as claimed in claim 10 of the German patent application with the official file reference 10 2004 031 407.1, which can execute an image decoding method, with a third unit for generating a succession of reconstructed original images with the aid of a second decoding method from a succession of second images, with at least one image area of one of the second images being decoded with the aid of an INTER decoding mode of the second encoding method, with at least one of the decoded images generated by a first encoding method being used by the INTER decoding mode as a reference image and with a different original image being represented by the decoded image used as a reference image from the original image which is represented by the second image of the image area to be decoded. The decoding device makes possible the implementation and execution of the image decoding method in a device. The encoding device and/or the decoding device can be implemented and operated in a radio device, especially in accordance with the UMTS Standard (UMTS—Universal Mobile Telecommunications system) and/or GSM Standard (GSM—Global System for Mobile Communication), or in a fixed network device which is connected to an Internet and/or to the Internet for example.

If a receiver receives a bit stream, which includes at least one identifier which indicates the use of at least one decoded image in the generation of at least one second image is preferably implemented in the decoding device, the bit stream can be received and processed by this receiver.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
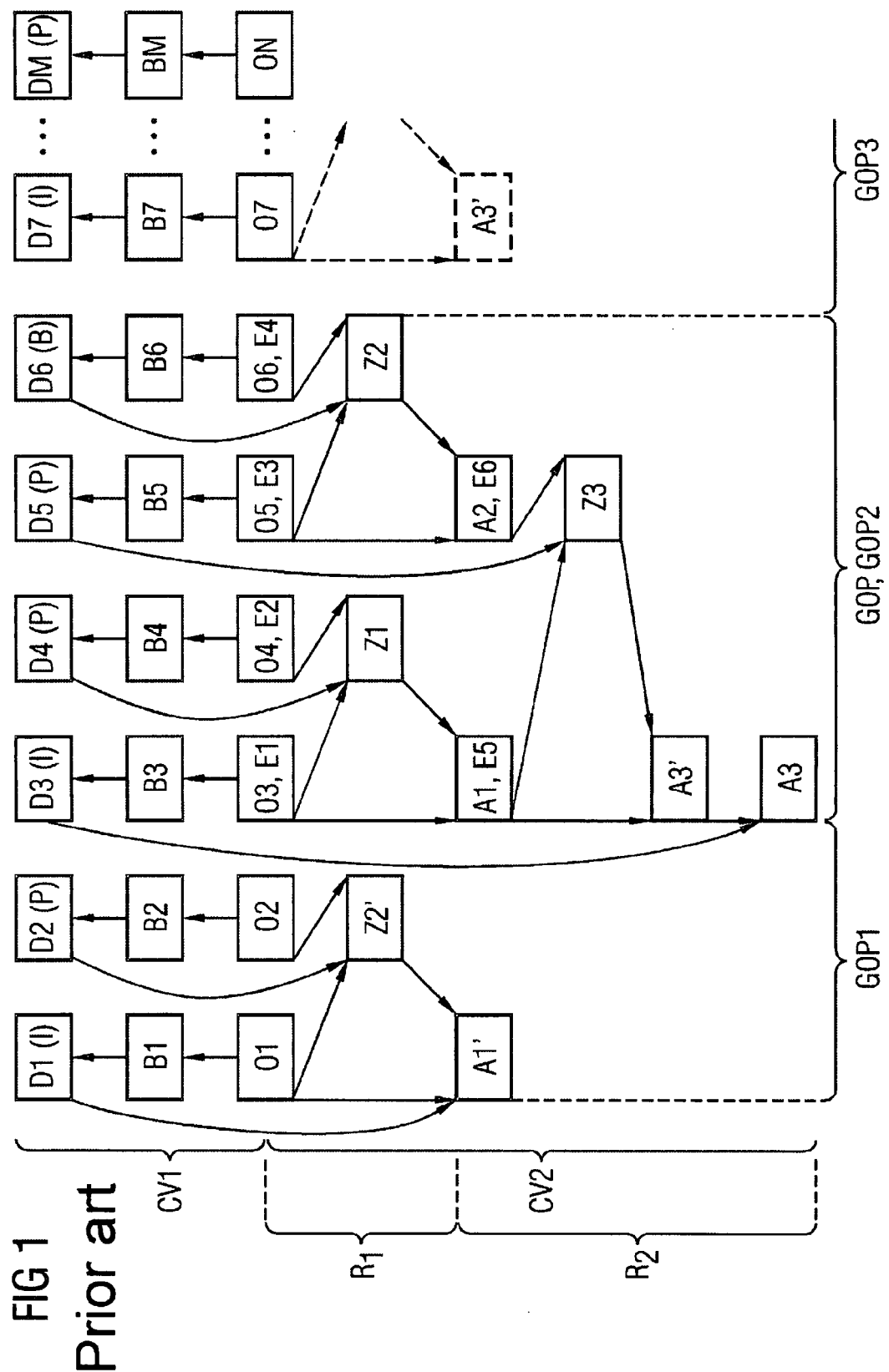
FIG. 1 a schematic diagram of encoding a succession of original images, with decoded images being created with a first encoding method after a movement-compensated, predictive encoding and second images being encoded with a second encoding method after a movement-compensated temporally filtered partial band encoding, taking into account the decoded images of the first encoding method.

Reference will now be made in detail to the preferred embodiments of the present invention, examples of which are illustrated in the accompanying drawings, wherein like reference numerals refer to like elements throughout.

FIG. 1 shows an exemplary embodiment of the method. In this case a succession of original images $O1, \ldots, ON$ is to be compressed using a first encoding method CV1 and a second encoding method CV2. These original images $O1, \ldots, ON$ have been created by a camera for example and are provided in color format with a brightness component and two chrominance components in an image size with 640×480 pixels. Furthermore the original images $O1, \ldots, ON$ can be subjected before their encoding to image processing such as noise reduction or edge sharpening for example.

Initially the first encoding method CV1 carries out a movement-compensated, predictive encoding of the original images $O1, \ldots, ON$. These types of movement-compensated, predictive encoding methods, such as the ITU-T H.263 standard for example, are known from S. Jun et al, *"Image and Video Compression for Multimedia Engineering*, CRC-Press (2000), ("Jun et al."). Using the method encoded images $B1, \ldots, BM$ can be created from the original images $O1, \ldots, ON$ by employing an INTRA encoding mode and/or INTER encoding mode for example. The INTRA encoding mode encodes individual image blocks of the respective original image $O1, \ldots, ON$ without taking account of other original images $O1, \ldots, ON$. In the INTER encoding mode on the other hand individual image blocks of the respective original images $O1, \ldots, ON$ are compressed, taking into account one or more already encoded images $B1$, BM or one or more decoded images $D1, \ldots, D4$=reference image RB. In addition it is advantageous, in the INTER encoding mode, to carry out an estimation of the movement of the image block of the original image $O1, \ldots, ON$ to be encoded and then to encode this image block only after a movement compensation. Methods for estimation of movement or for movement compensation are known from Jun et al. Furthermore the number M of the encoded images $B1, \ldots, BM$ can differ from the number N of the original images $O1, \ldots, ON$, since for example not all original images $O1, \ldots, ON$ are encoded.

In a next step a succession of decoded images $D1, \ldots DM$ are created from the encoded images $B1, \ldots, BM$ with the aid of the first encoding method CV1. Furthermore, for each decoded image $D1, \ldots, DM$, a separate decoding list can be created which specifies which image blocks of the respective decoded image $D1, \ldots, DM$ have been encoded with the INTRA encoding mode and which with the INTER encoding mode for example. These decoded images $D1, \ldots, DM$ are taken into account in the subsequent processing steps by the second encoding method CV2. For the exemplary embodiment shown in FIG. 1 those decoded images $D1, \ldots, DM$ for which all image blocks were created with the INTRA encoding mode are marked "I" and those for which at least one image block was encoded with the aid of the INTER encoding mode are marked "P" and those which were encoded with the aid of a bidirectional predictive encoding mode are marked "B".

In a subsequent step all consecutive original images $O1, \ldots, ON$ of a relevant image group GOP are encoded with the aid of the second encoding method CV2. In the present exemplary embodiment three different image groups GOP1, GOP2, GOP3 can be seen. In this case the number of the original images to be encoded of the second image group GOP2 has been selected as four. The number of original images to be encoded per image group GOP can vary, e.g. first of all two, then four and then eight original images are encoded in the relevant image group GOP1, GOP2, GOP3. Thus for example the first original image of the second image group GOP2 to be encoded is the third original image O3.

Decoded images $D1, \ldots, D4$ are typically to be understood as the complete decoding of the respective associated encoded image $B1, \ldots, B4$ or also an extraction of one or more syntax elements for the respective associated encoded image $B1, \ldots, B4$, such as a block type or macroblock or a motion vector for example.

A movement-compensated, temporally filtered partial band encoding method is to be seen as an encoding method in which, at a plurality of resolution levels R1, R2, at least one output image A1', A3 in each case is created from at least two input images. In addition intermediate images Z2', Z1, Z2, Z3 can also be created. The relevant intermediate image represents the movement-compensated components of the associated input images of a first partial band. The relevant output image comprises the movement-compensated component of the associated input images of a second partial band. The first partial band typically comprises the high frequency and the second partial band the low-frequency components. At each lower resolution level R2 the output images A1, A2 of the higher resolution level R1 become the input images E5, E6.

The second encoding method CV2 depicted in FIG. 1 uses within the second image group GOP2 two resolution levels R1, R2. In the first resolution level R1 an intermediate image Z1, Z2 and an output image A1, A2 respectively are created from two input images E1 and E2, E3 and E4 and the two associated decoded images D4, D6. The two output images A1, A2 are used as input images E5, E6 of the second resolution level R2. At the second resolution level R2, which in this exemplary embodiment corresponds to the lower resolution level, a third intermediate image Z3 and a third output image A3 are created from the input images E5, E6 together with the decoded images D3, D5. In this exemplary embodiment the low resolution level R2 simultaneously represents the lowest resolution level. The lowest resolution level can be seen as that resolution level which generates only one output image within the image group GOP. The output images A1', A3 of the low resolution level R2 and the intermediate images Z2', Z1, Z2, Z3 are referred to as second images.

Figure 2:
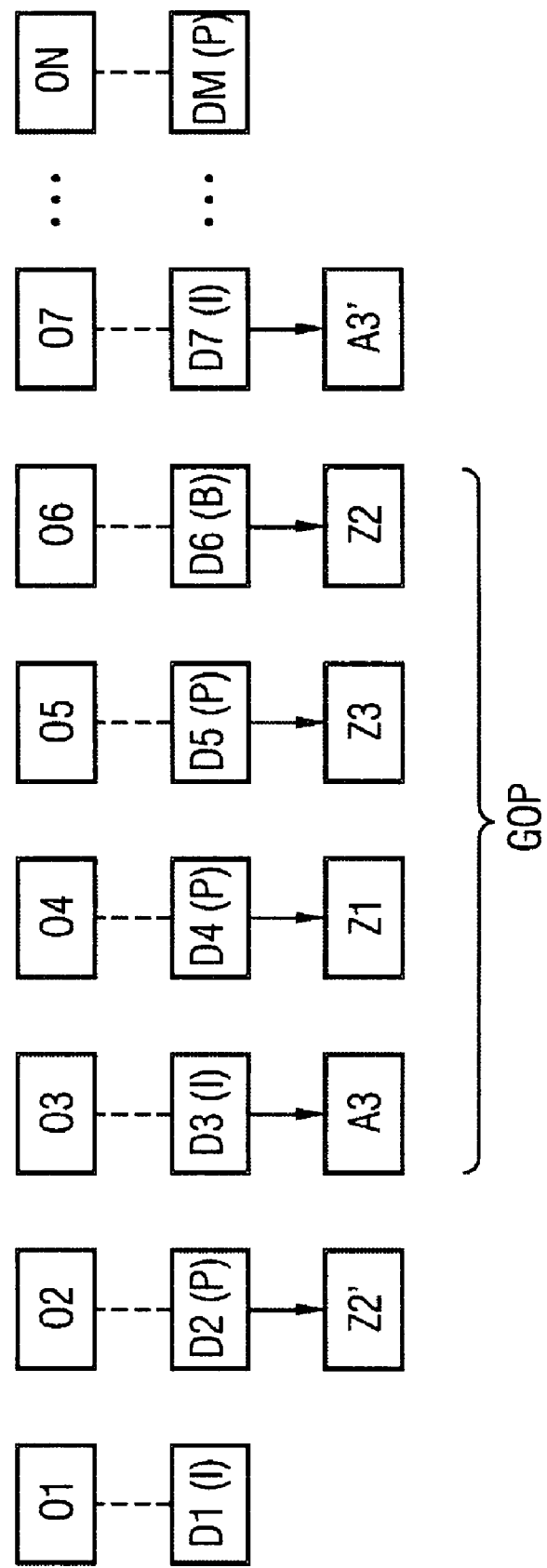
FIG. 2 a dependency in the encoding of the second images in relation to the decoded images.

With the aid of FIG. 2 a dependency of the second images Z1, Z2, Z3, A3 on the decoded images D3, D4, D5, D6, as has already been explained in greater detail in FIG. 1, is shown in simplified form. The arrow marks that decoded image or those decoded images which are to be taken into account in the encoding of a specific second image. Thus for example the third decoded image D3 is taken into account in the creation of the second image A3. In this case the third decoded image D3 can for example serve as reference image RB in a predictive INTRA encoding of the second image A3. The specification of the original images O1, . . . , ON is merely intended to indicate in FIG. 2 the original image to which the respective decoded image or second image belongs as regards time. For example both the second image Z3 and also the decoded image D5 represent original image O5.

The assignment of a decoded image D3 decoded with an encoding mode of the first encoding method CV1, such as an INTRA encoding mode for example, in the generation of the second image A3 in FIG. 1 or 2 only represents one of the possible embodiments. The second image A3 can thus be generated with a decoded image D3 which has been encoded with an encoding mode which differs from the INTRA encoding mode, such as a bidirectional predictive encoding mode for example.

Figure 3:
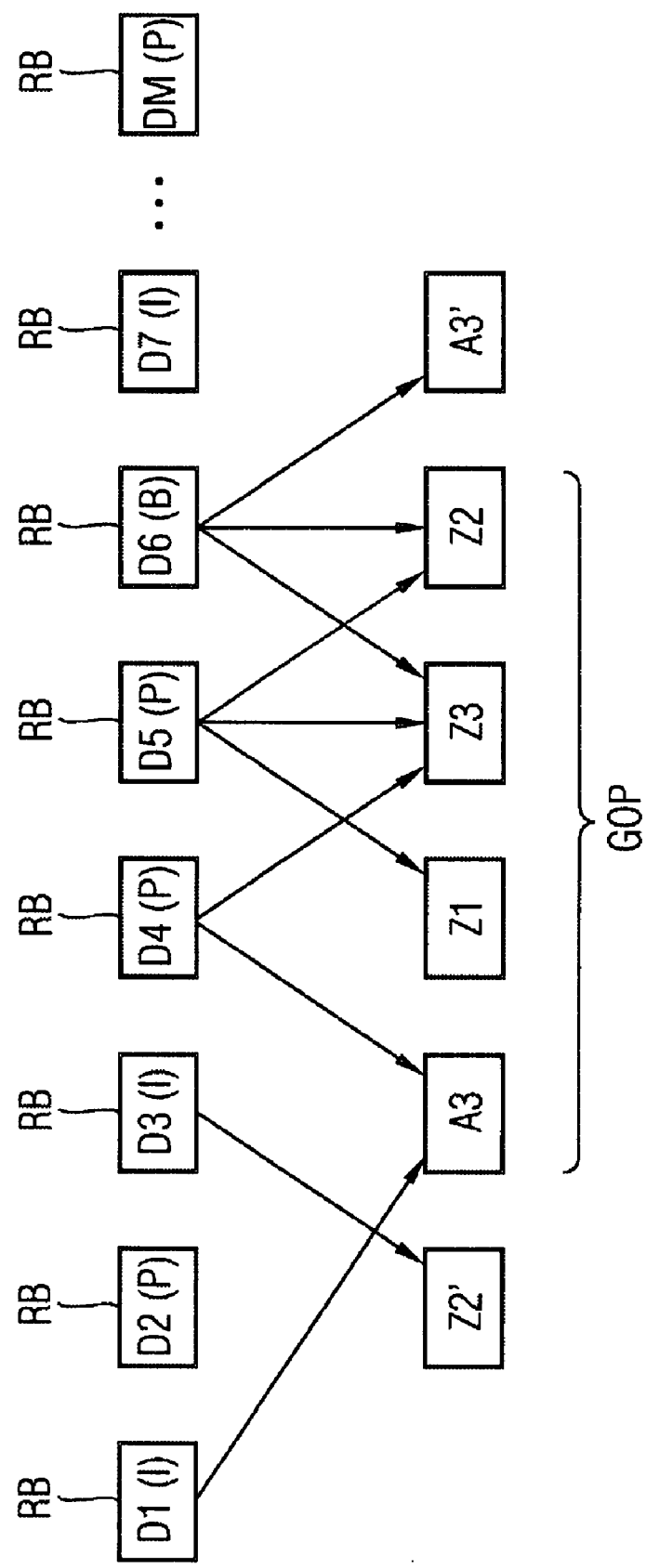
FIG. 3 the dependency in the encoding of the second images from the decoded images, with each second image being predicted from at least two decoded images.

A variant of the bidirectional coding method can be seen in FIG. 3. This diagram shows that each second image is generated using at least one decoded image in accordance with the second encoding method CV2. In this case the decoded image D5 has been taken into account in the creation of the second image Z1. Here the decoded image D1, . . . , DN is referred to as the reference image RB, since it is used for example for an INTER encoding with a temporal prediction for the generation of the second image Z3. Basically the number of decoded images which are included for the creation of a second image is not established as a predefined value, such as 1 or 3 for example. The number of decoded images to be considered can also vary for the generation of a second image. Thus the two decoded images D1 and D4 are taken into account for the creation of the second image A3 and the three decoded images D4, D5 and D6 are taken into account for creating the second image Z3. Furthermore it is also not necessary for only adjacent decoded images to be included for the generation of the second image. For example the decoded image D1 is taken into account for creation of the second image A3. At least one decoded image is taken into account in the generation of a second image, with at least one decoded image D5 to be used as a reference image RB however, which represents a different original image O5 from the original image O5 which is represented by the second image Z1.

Furthermore it is also not necessary, for an entire image, i.e. all areas of an image, to be encoded taking into account the same reference image or images RB. Thus a first area of the second image Z1 can be generated with the aid of reference image RB=D1 and a second area of the image with the aid of reference image RB=D1, D3. An image area includes any number of pixels, such as for example an image block of 8×8 pixels and/or a macroblock of for example 16×16 pixels and/or pixels which are enclosed by any given shape of image region.

In addition it can be worthwhile in practice to take account when creating a second image of that decoded image which represents the same original image as the second image to be created. Thus for example the decoded image D5 is also taken into account in the creation of the second image Z3. This procedure can be worthwhile because the best correlation for the prediction is found in the decoded image D5 which represents the same original image O5 as the second image Z3 to be created, and thus a high degree of compression can be obtained.

Figure 4:
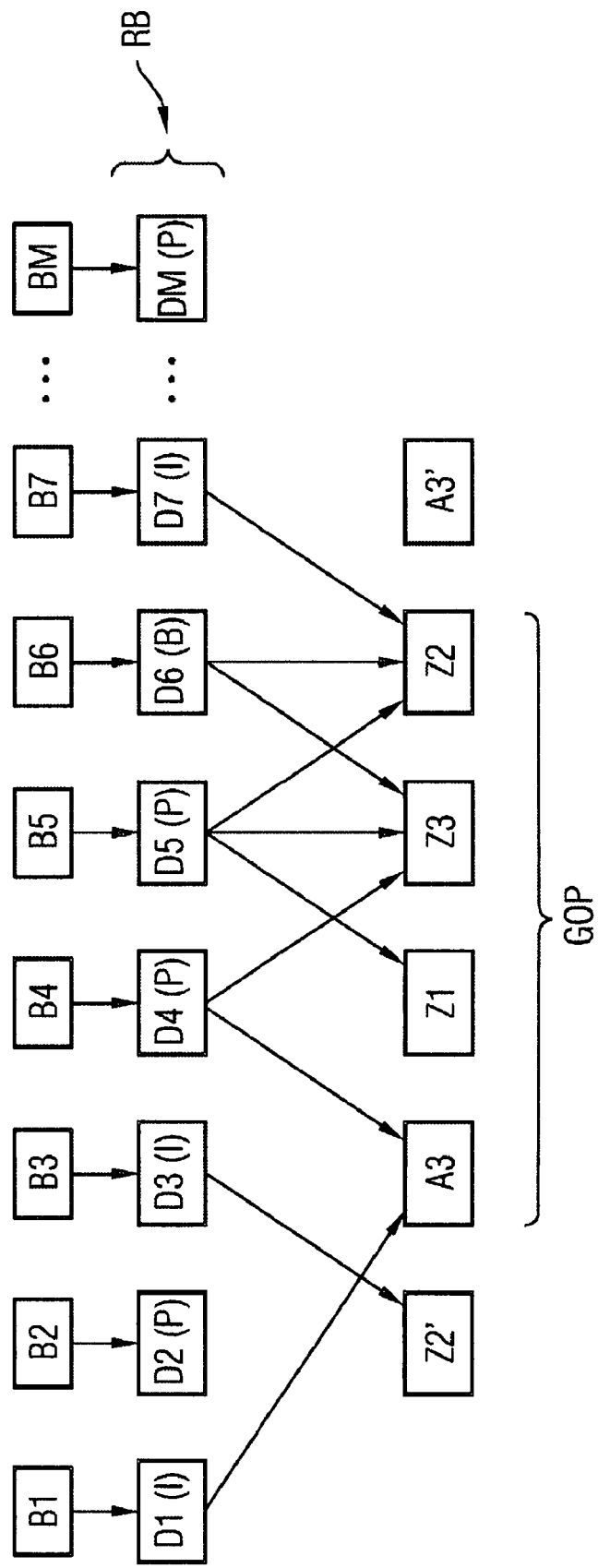
FIG. 4 the dependency in the encoding of the second images from the decoded images, with the decoded images being created by increasing the image size from encoded images in accordance with the first encoding method.

In a further variant of the video encoding method, before the generation of one of the second images Z1, Z2, Z3, A3 at least one partial area of a decoded image D1, . . . , DM with a first image size BG1 is enlarged or reduced into a second image size BG2. Such a partial area describes a plurality of pixels, with the partial area being able to have any given form. In the following example the partial area includes a completely decoded image. To represent this variant better the encoded images B1, . . . , BM associated with the decoded images D1, . . . , DM are also depicted in FIG. 4. Thus a first image size BG1 of one of the encoded images B1, . . . , BM amounts to 100×120 pixels for example. It can now be advantageous for creating the second image for one or more decoded images to have the second image size BG2. The second image size BG2 amounts to 200×240 pixels for example. To this end the encoded images B1, . . . , BM are first decoded and subsequently enlarged with the aid of scaling from the first image size BG1 into the second image size BG2. These enlarged decoded images are the decoded images D1, . . . , DM. In another exemplary embodiment it is worthwhile, before generating one of the second images, to undertake a reduction of at least one partial area of one of the decoded images. Furthermore it can also be useful in practice for a partial area of the encoded images B1, . . . , B4 to undertake a reduction after their decoding and for the remaining encoded images B5, . . . , BM to undertake an enlargement after their decoding of at least one partial area (this is not shown in the diagram).

In a further embodiment it can be advantageous for at least one decoded image D1, . . . , DM to be created with the aid of the first encoding method CV1 by the INTRA encoding mode or of the INTER encoding mode and/or of a bidirectional predictive encoding mode. In the bidirectional predictive encoding mode a decoded image or an encoded image is created by prediction from two or more decoded images. With the aid of the bidirectional predictive encoding mode the number of decoded images can be increased in relation to the number of original images. This means that for generation of second images, it is also possible to take account of decoded images which were created by the bidirectional predictive encoding mode. This can lead to an improvement of the compression rate. Furthermore hierarchical B images can also be used in the generation of at least one second image. Hierarchical B images are each created by two images.

Figure 5:
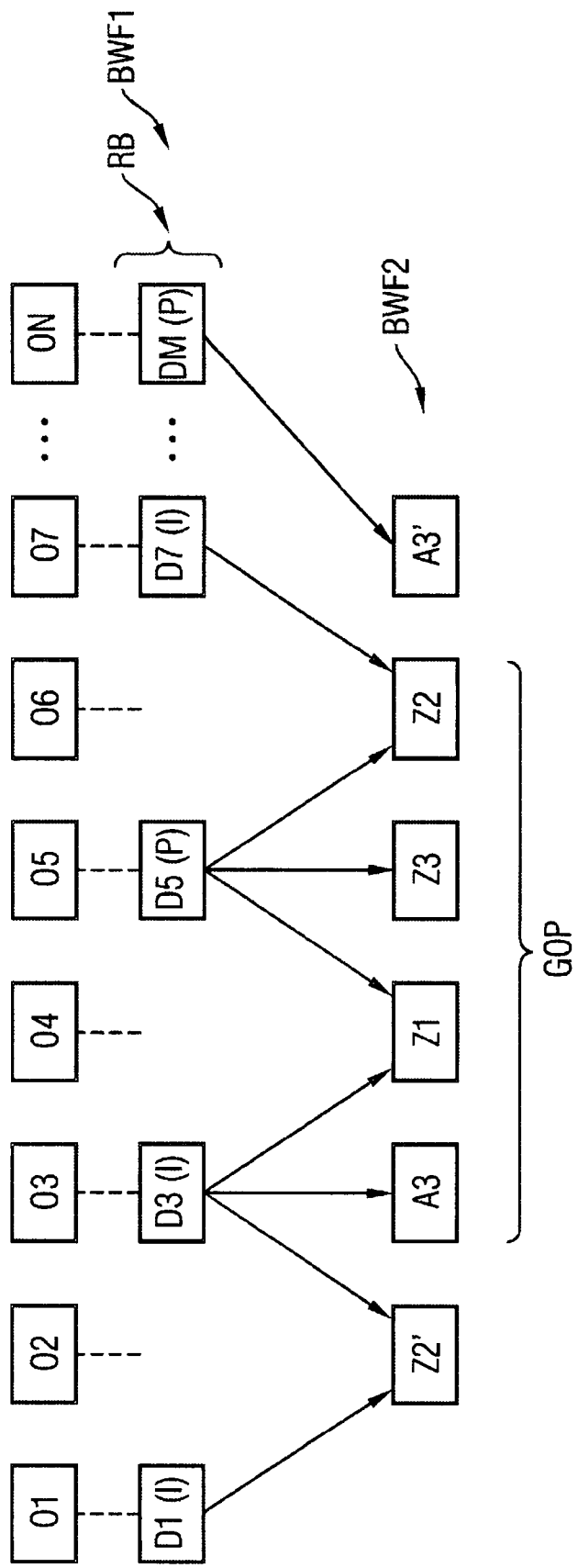
FIG. 5 a schematic diagram of the dependency in the encoding of the second images from the decoded images, with a succession of decoded images exhibiting a reduced image refresh rate in relation to a succession of second images.

It can furthermore be worthwhile in practice in the first encoding method CV1 for the succession of the decoded images D1, ..., DM to be created with a first image refresh frequency BWF1 and in the second encoding method CV2 for the succession of second images Z1, Z2, Z3, A3 to be created with a second image refresh frequency BWF2. This is explained in more detail with reference to FIG. 5. In FIG. 5 the succession of decoded images has merely been created for each second original image. This means that no associated decoded image is available for the original image O2, O4, O6. For generation of the second images there is merely recourse to the available decoded images. Thus for example the decoded images D7, D5 are taken into account for creating the second image Z2. After creation of all second images it can be seen from FIG. 5 that the second image refresh frequency BWF2 is twice as great as the first image refresh frequency BWF1, since twice as many second images as decoded images have been created.

Figure 8:
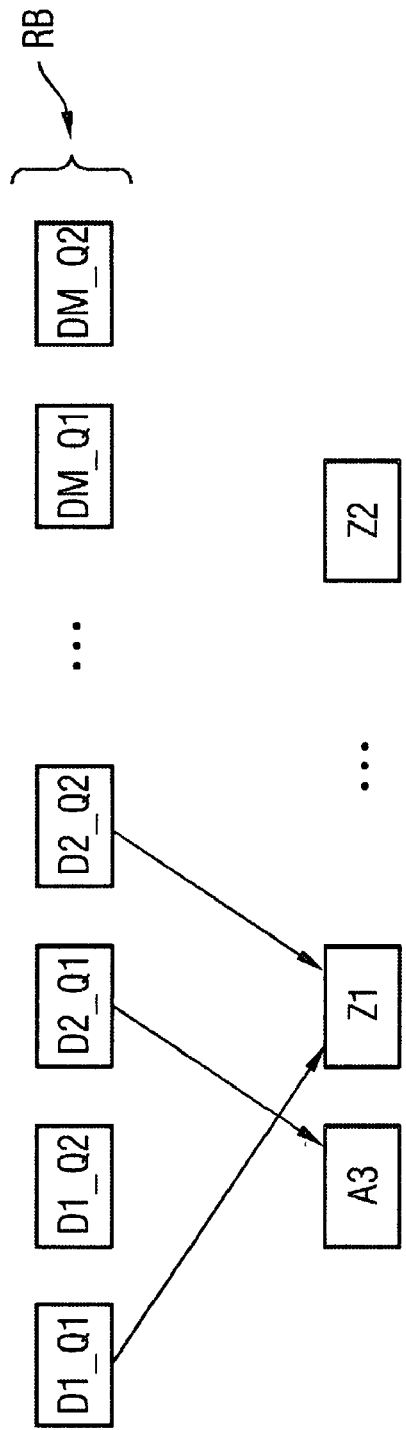
FIG. 8 a dependency in the encoding of the second images in relation to a first quality level of a decoded image.

In a further variant of the image encoding method in accordance with FIG. 8 the succession of the decoded images D1_Q1, D1_Q2, ..., DM_Q1, DM_Q2 can be created at a plurality of first image quality levels Q1, Q2 by the first encoding method CV1 and the succession of the second images Z1, Z2, Z3, A3 can be created at a plurality of second image quality levels Q1', Q2' by the second encoding method CV2, with the succession of the decoded images D1_Q1, D_Q2, ..., DM_Q1, DM_Q2, especially with the highest first image quality level Q2, being taken into account for generating the succession of second images Z1, Z2, Z3, A3. For example two different first quality levels, for example. D1_Q1, D1_Q2 are provided for each decoded image D1, ..., DM. Thus the decoded image D1_Q1 could have available to it a first quality level=basic quality level and a second quality level improved in relation to the basic quality level in the form of the decoded image D1_Q2. Thus a plurality of first image quality levels is equal to two. Furthermore the number of quality levels can differ for each decoded image D1_Q1, ..., DM_Q2. In an advantageous variant, for creating the second images A3, Z1, Z2, Z3, only that quality level of the decoded images is now taken into account which corresponds to the highest first image quality level, i.e. the decoded image D1_Q2 for the highest first image quality level Q2 for example. Furthermore the second images Z1, Z2, Z3, A3 can also have a plurality of quality levels available, for example three quality levels Q1', Q2', Q3'. In this case a plurality of second image quality levels is equal to three.

Both a single encoding method and also two different encoding methods can be used for the first and second encoding method CV1, CV2. Furthermore the present invention is not just restricted to the use of only two encoding methods, i.e. the first and second encoding method, but can also be used for three or more encoding methods. For example original images are encoded with a first and second encoding method and a third encoding method uses these encoded or decoded images of the first and/or second encoding method to generate the second images.

The image encoding method can be executed with an encoding device EV. The image encoding method is implemented with the aid of a first and second units M1, M2 of the encoding device EV. In addition the encoding device can include a transmitter MS. With this a bit stream BS which is created by the encoding device EV, and includes at least one identifier KN, a decoded image D1 and at least one second image Z1, can be transmitted over a data transmission network UE to a decoding device DV.

A image decoding method executes one or more steps for decoding at least one image encoded in accordance with the image encoding method, especially one of the second images Z1, Z2, Z3, A3. With the aid of the image decoding method, one or more reconstructed original images K1, ..., KN can be recovered from the second images, with the reconstructed original images K1, ..., KN representing one or more of the original images O1, ..., ON. In the execution of the image decoding method those decoded images D1, ..., DN which were used for the generation of the second images are taken into account as reference images RB. The image decoding method can be executed with a decoding device DV. Furthermore the decoder unit can contain a receive module ME for receiving the bit stream BS which includes at least one identifier KN, a decoded image D1 and at least one second image Z1. The image decoding method can be implemented with the aid of a decoding device DV, including a third unit for executing the method described above.

Figure 6:
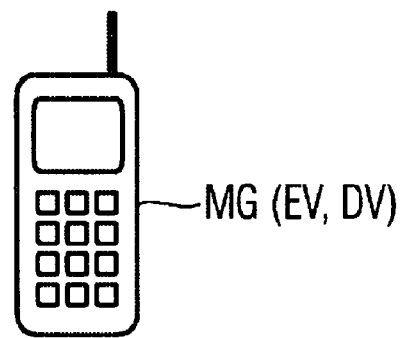
FIG. 6 a mobile terminal which includes an encoding and a decoding device for executing the method.

A mobile terminal MG can be seen in FIG. 6. The encoding device EV and/or the decoding device DV can be implemented in the terminal MG and can implement the image encoding method or image decoding method. The mobile terminal MG is especially a mobile radio device according to the GSM Standard (GSM—Global System for Mobile Communication).

Figure 7:
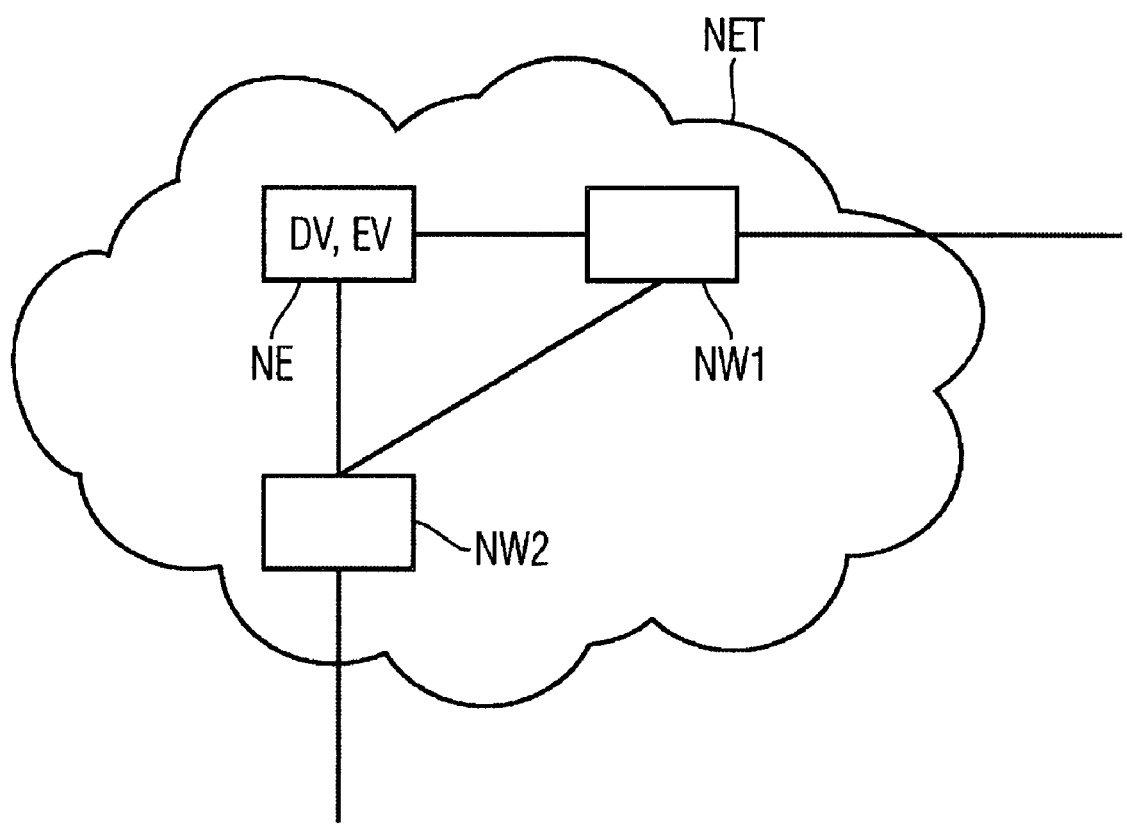
FIG. 7 a network with a network unit which includes an encoding and a decoding device for executing the method.

FIG. 7 depicts a network NET. This network NET includes a network unit NE which for example implements the encoding device EV and/or the decoding device DV. Furthermore a first and second network element NW1, NW2 can additionally be present within the network NET, which for example are connected to each other and/or to the network unit NE. The network unit NE, which includes the encoding device EV and/or the decoding device DV, can execute the image encoding method or image decoding method with the aid of these devices.

Figure 9:
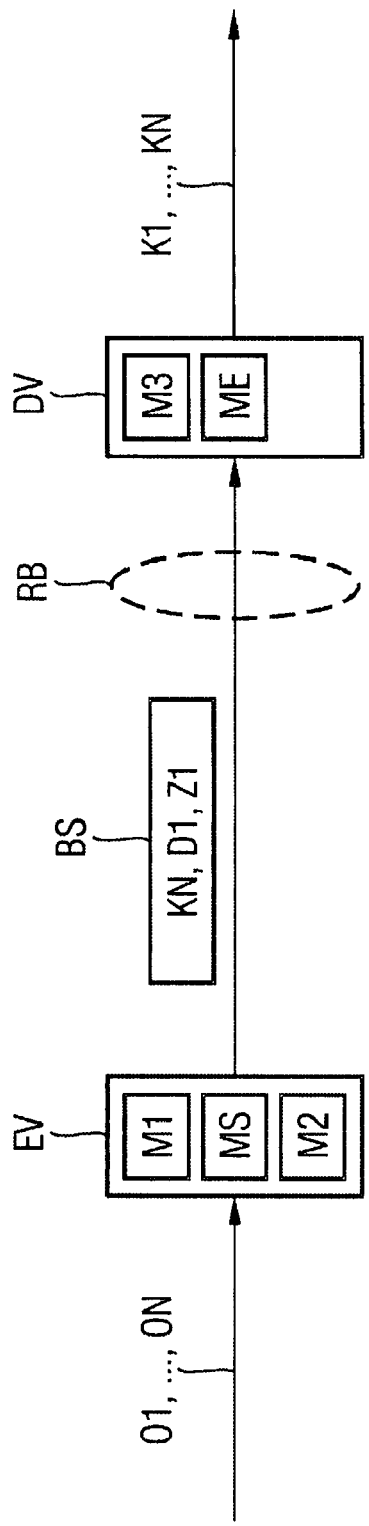
FIG. 9 an encoding and decoding device, linked to a data transmission network, which implement an execution of the method.

FIG. 9 depicts both the encoder unit EV, including the first and second units M1, M2 and the transmitter MS for generating a bit stream BS, including at least one identifier KN, a decoded image D1 and at least one second image Z1, as well as a decoder unit DV, including the third unit M3 and a receiver ME for receiving the bit stream BS. The encoding device EV and the decoding device DV are connected via the data transmission network UE for exchanging payload data and control data with each other. The transmission network UE is embodied for example in accordance with the GSM Standard or the ISDN Standard (ISDN—Integrated Subscriber digital Network).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. An image encoding method, comprising;
   generating a succession of decoded images from a respectively corresponding succession of original images with the aid of a first encoding method;
   generating a succession of second images from a respectively corresponding group of images from the succession of original images with the aid of a second encoding method comprising:
   generating at least one image area of one of the second images with the aid of an INTER-coding mode of the second encoding method, whereby the second image represents a first original image of the original images, and using at least one of the decoded images as a reference image to generate the image area with the aid of the INTER-coding mode, whereby the decoded image used as the reference image represents a second original image of the original images, and selecting the reference image such that the first original image differs from the second original image.

2. The image encoding method as claimed in claim 1, wherein,
at least one of the second images is generated using at least first and second reference images,
the first reference image was generated from a different original image than is being used to generate the second image, and
the second reference image was generated from the original image being used to generate the second image.

3. The image encoding method as claimed in 2, wherein, before encoding the second image a portion of the reference image with a first image size is enlarged or reduced into a second image size.

4. The image encoding method as claimed in 3, wherein, at least one decoded image is generated using an INTRA encoding mode and/or an INTER encoding mode and/or of a bidirectional predictive encoding mode within the first encoding method.

5. The image encoding method as claimed in 4, wherein, the succession of decoded images is generated with a first image refresh frequency and the succession of second images is generated with a second image refresh frequency different from the first image refresh frequency.

6. The image encoding method as claimed in 5, wherein, the succession of decoded images is generated at a plurality of first image quality levels,
the succession of second images is generated at a plurality of second image quality levels, and
the decoded images having the highest first image quality level are selected as reference images for generating the succession of second images.

7. The image encoding method as claimed in 6, wherein, a movement-compensated, predictive encoding is used as the first encoding method, and
a movement-compensated temporally filtered partial band encoding is used as the second encoding method.

8. The image encoding method as claimed in 6, wherein, a bit stream is created with the second image encoding method, and
the bit stream includes an identifier which indicates that at least one reference image was used to generate the second images.

9. The image encoding method as claimed in claim 8, further comprising:
decoding the succession of second images to generate a succession of reconstructed original images using a second decoding method having an INTER decoding mode, at least one image area of one of the second images being decoded with the INTER decoding mode; and
using at least one of the decoded images by the INTER encoding mode, as a reference image to generate each reconstructed original image, the reference image being selected from the decoded images such that a different original image is used to generate the reference image than is to be represented by the reconstructed original image.

10. The image encoding method as claimed in 9, wherein, for each reconstructed original image, the identifier in the bit stream is used to select which decoded image should be used as the reference image to generate the reconstructed original image.

11. The image encoding method as claimed in 1, wherein, before encoding the second image a portion of the reference image with a first image size is enlarged or reduced into a second image size.

12. The image encoding method as claimed in 1, wherein, at least one decoded image is generated using an INTRA encoding mode and/or an INTER encoding mode and/or of a bidirectional predictive encoding mode within the first encoding method.

13. The image encoding method as claimed in 1, wherein, the succession of decoded images is generated with a first image refresh frequency and the succession of second images is generated with a second image refresh frequency different from the first image refresh frequency.

14. The image encoding method as claimed in 1, wherein, the succession of decoded images is generated at a plurality of first image quality levels,
the succession of second images is generated at a plurality of second image quality levels, and
the decoded images having the highest first image quality level are selected as reference images for generating the succession of second images.

15. The image encoding method as claimed in 1, wherein, a movement-compensated, predictive encoding is used as the first encoding method, and
a movement-compensated temporally filtered partial band encoding is used as the second encoding method.

16. The image encoding method as claimed in 1, wherein, a bit stream is created with the second image encoding method, and
the bit stream includes an identifier which indicates that at least one reference image was used to generate the second images.

17. The image encoding method as claimed in claim 16, further comprising:
decoding the succession of second images to generate a succession of reconstructed original images using a second decoding method having an INTER decoding mode, at least one image area of one of the second images being decoded with the INTER decoding mode; and
using at least one of the decoded images by the INTER encoding mode, as a reference image to generate each reconstructed original image, the reference image being selected from the decoded images such that a different original image is used to generate the reference image than is to be represented by the reconstructed original image.

18. The image encoding method as claimed in claim 17, wherein,
for each reconstructed original image, an identifier in a second image bit stream is used to select which decoded image should be used as the reference image to generate the reconstructed original image.

19. An encoding device, comprising:
a decoder to generate a succession of decoded images from a succession of original images using a first encoding method;
an image generator to generate a succession of second images from an image group of the succession of original images, the second images being generated using a second encoding method having an INTER encoding mode, wherein at least one image area of one of the second images is encoded with the INTER encoding mode of the second encoding method, whereby the second image represents a first original image of the original images at least one of the decoded images is used by the INTER encoding mode, as a reference image to generate the image area with the aid of the INTER-coding mode, whereby the decoded image used as the reference image represents a second original image of the original images, and the reference image is selected such that the first original image differs from the second original image.

20. The encoding device as claimed in claim 19, further comprising a transmitter to transmit a bit stream created with the second encoding method, the bit stream including an identifier which indicates that at least one reference image was used to generate the second images.

21. The encoding device as claimed in claim 19, further comprising:

a re-constructor to decode the succession of second images and generate a succession of reconstructed original images using a second decoding method having an INTER decoding mode, at least one image area of one of the second images being decoded with the INTER decoding mode; and a reference unit to use at least one of the decoded images by the INTER encoding mode, as a reference image to generate each reconstructed original image, the reference image being selected from the decoded images such that a different original image is used to generate the reference image than is represented by the reconstructed original image.

22. The encoding device as claimed in claim 21 wherein, the device further comprises a transmitter to transmit a bit stream created with the second encoding method, the bit stream including an identifier which indicates that at least one reference image was used to generate the second images, and for each reconstructed original image, the identifier in the bit stream is used to select which decoded image should be used as the reference image to generate the reconstructed original image.

23. An decoding device to decode a succession of second images produced according to claim 1, the decoding device comprising:

a decoder to decode the succession of second images and generate a succession of reconstructed original images using a second decoding method having an INTER decoding mode, at least one image area of one of the second images being decoded with the INTER decoding mode; and a reference unit to use at least one of the decoded images by the INTER encoding mode, as a reference image to generate each reconstructed original image, the reference image being selected from the decoded images such that a different original image is used to generate the reference image than is represented by the reconstructed original image.

24. An image decoding method to decode a succession of second images produced according to claim 1, the decoding method comprising:

decoding the succession of second images to generate a succession of reconstructed original images using a second decoding method having an INTER decoding mode, at least one image area of one of the second images being decoded with the INTER decoding mode; and using at least one of the decoded images by the INTER encoding mode, as a reference image to generate each reconstructed original image, the reference image being selected from the decoded images such that a different original image is used to generate the reference image than is to be represented by the reconstructed original image.

* * * * *